(12) United States Patent
Valois

(10) Patent No.: US 11,781,727 B2
(45) Date of Patent: Oct. 10, 2023

(54) LIGHT GUIDE HAVING A PARTIALLY COLLIMATING INPUT FACE

(71) Applicant: VALEO VISION BELGIQUE, Meslin l'Eveque (BE)

(72) Inventor: Christophe Valois, Bobigny (FR)

(73) Assignee: VALEO VISION BELGIQUE, Meslin l'Eveque (BE)

( * ) Notice: Subject to any disclaimer, the term of this patent is extended or adjusted under 35 U.S.C. 154(b) by 0 days.

(21) Appl. No.: 17/787,008

(22) PCT Filed: Dec. 18, 2020

(86) PCT No.: PCT/EP2020/087328
§ 371 (c)(1),
(2) Date: Jun. 17, 2022

(87) PCT Pub. No.: WO2021/123386
PCT Pub. Date: Jun. 24, 2021

(65) Prior Publication Data
US 2023/0012810 A1 Jan. 19, 2023

(30) Foreign Application Priority Data

Dec. 20, 2019 (FR) .................................... 19 15234

(51) Int. Cl.
*F21S 43/237* (2018.01)
*F21V 8/00* (2006.01)
*F21S 43/247* (2018.01)

(52) U.S. Cl.
CPC ........... *F21S 43/237* (2018.01); *F21S 43/247* (2018.01); *G02B 6/001* (2013.01)

(58) Field of Classification Search
CPC ........ F21S 43/237; F21S 43/247; G02B 6/001
See application file for complete search history.

(56) References Cited

U.S. PATENT DOCUMENTS

| | | |
|---|---|---|
| 2002/0141174 A1 | 10/2002 | Parker et al. |
| 2003/0007344 A1 | 1/2003 | Parker |
| 2003/0123245 A1 | 7/2003 | Parker et al. |
| 2003/0123246 A1 | 7/2003 | Parker |
| 2003/0123247 A1 | 7/2003 | Parker et al. |
| 2003/0202338 A1 | 10/2003 | Parker |
| 2004/0012946 A1 | 1/2004 | Parker et al. |

(Continued)

FOREIGN PATENT DOCUMENTS

| | | |
|---|---|---|
| EP | 2 711 610 A1 | 3/2014 |
| FR | 3 061 537 A1 | 7/2018 |

OTHER PUBLICATIONS

International Search Report dated Mar. 4, 2021 in PCT/EP2020/087328, filed on Dec. 18, 2020, 2 pages.

*Primary Examiner* — Thomas M Sember
(74) *Attorney, Agent, or Firm* — Oblon, McClelland, Maier & Neustadt, L.L.P.

(57) ABSTRACT

A light guide extending in a main direction and including an inlet face for the light emitted by a light source, the inlet face being contoured to form a collimator. The light guide includes a face for guiding the light, a light outlet face, and a face for decoupling the light towards the outlet face, the decoupling face being transversely opposite to the outlet face. At least one portion of the profile of the inlet face is constant in a transverse direction so as not to collimate the light in a longitudinal plane including the transverse direction but in a longitudinal plane perpendicular to the transverse direction.

20 Claims, 2 Drawing Sheets

(56) References Cited

U.S. PATENT DOCUMENTS

| | | |
|---|---|---|
| 2004/0080927 A1 | 4/2004 | Parker et al. |
| 2004/0165372 A1 | 8/2004 | Parker |
| 2005/0007759 A1 | 1/2005 | Parker |
| 2005/0094418 A1 | 5/2005 | Parker |
| 2005/0111238 A1 | 5/2005 | Parker |
| 2005/0111241 A1 | 5/2005 | Parker |
| 2005/0207154 A1 | 9/2005 | Parker |
| 2005/0207178 A1 | 9/2005 | Parker |
| 2005/0213322 A1 | 9/2005 | Parker |
| 2005/0213323 A1 | 9/2005 | Parker |
| 2005/0213349 A1 | 9/2005 | Parker |
| 2006/0028817 A1 | 2/2006 | Parker |
| 2006/0028840 A1 | 2/2006 | Parker |
| 2006/0028841 A1 | 2/2006 | Parker |
| 2006/0028843 A1 | 2/2006 | Parker |
| 2006/0028844 A1 | 2/2006 | Parker |
| 2006/0158906 A1 | 7/2006 | Parker |
| 2006/0232965 A1 | 10/2006 | Parker |
| 2006/0262567 A1 | 11/2006 | Parker |
| 2006/0274554 A1 | 12/2006 | Parker |
| 2006/0274555 A1 | 12/2006 | Parker |
| 2007/0103933 A1 | 5/2007 | Parker |
| 2007/0133224 A1 | 6/2007 | Parker et al. |
| 2007/0147087 A1 | 6/2007 | Parker et al. |
| 2007/0153549 A1 | 7/2007 | Parker |
| 2010/0172151 A1 | 7/2010 | Parker |
| 2011/0222310 A1 | 9/2011 | Parker |

LIGHT GUIDE HAVING A PARTIALLY COLLIMATING INPUT FACE

TECHNICAL FIELD

The invention relates to the field of lighting and light signaling, especially for automotive vehicles.

PRIOR ART

In various light-based applications, especially in the field of light-based signaling, light guides are commonly used. They have the advantage of being able to bring light to confined places, at a distance from the light source. They also allow light to be diffused in a continuous and homogeneous manner following curved profiles. To that end, it is important to ensure controlled propagation of the light through the guide.

The published patent document FR 2 888917 A discloses optical guides provided, at their entrance faces, with collimators, in particular in the form of Fresnel lenses, which are rotationally symmetrical. These collimators allow the light to propagate along the main direction of the guide in order to reach an exit face, in particular of lenticular type at the distal end of the guide. The use of such collimators for an optical guide with lateral decoupling and exit faces is not suitable because the light propagating longitudinally will fail to encounter the decoupling face and, consequently, the exit face.

The published patent document EP 1 739 468 A1 discloses an optical guide with a particular entrance face designed to make the light more homogeneous at the start of the guide, that is to say close to the entrance face. The entrance face has regions of total reflection that are configured to reflect the light at large angles with respect to the main direction of the guide, so as to favor reflections off the guide face of the guide and thus ensure a certain level of homogeneity of light close to the entrance face. These measures are of interest when the exit face or one of the light exit faces is close to the entrance face. They are no longer useful after a certain distance from the entrance face.

SUMMARY OF THE INVENTION

The object of the invention is to overcome at least one of the drawbacks of the aforementioned prior art. More particularly, the object of the invention is to allow a light guide to illuminate a lateral exit face in a homogeneous manner and to do so in particular over a great length.

The subject of the invention is a light guide made of transparent or translucent material, extending in a main direction and comprising an entrance face for the light emitted by a light source, said entrance face being profiled to form a collimator; a guide face for guiding the light through the transparent or translucent material by total internal reflection; a light exit face; and a decoupling face for decoupling the light toward the exit face by means of reflection facets, said decoupling face being transversely opposite the exit face. According to the invention, at least one portion of the entrance face is a three-dimensional surface formed by translating a two-dimensional planar profile in a transverse direction, referred to as a portion of constant profile, so as not to collimate the light in a longitudinal plane comprising the transverse direction and to collimate in a longitudinal plane perpendicular to said transverse direction.

The two-dimensional planar profile may also be called the generator profile.

The entrance face is frontal and the guide, decoupling and exit faces are lateral.

The light guide has a cross section with a closed and rounded, preferably circular or oval, contour.

Given that the cross section of the light guide has a closed and rounded contour, it is understood that the portion of constant profile may vary from when it is adjacent to the contour of the entrance face. In other words, the portion of constant profile is constant along the transverse direction between the limits of said profile which varies along the transverse direction taking into account the closed and rounded contour of the entrance face. Stated otherwise, said portion has a constant basic shape, which is more or less truncated depending on the shape of said contour.

According to one advantageous embodiment of the invention, the transverse direction is perpendicular to the main direction.

According to one advantageous embodiment of the invention, the transverse direction corresponds to a direction of opposition between the decoupling face and the exit face. The direction of opposition in question passes through a center of the decoupling face and a center of the exit face.

According to one example, the light guide may have a cross section that allows the light rays deflected or reflected by the decoupling face to directly reach the exit face without being reflected by the other faces of the light guide. In other words, the path of said deflected or reflected light rays is a direct path from the coupling face to the exit face. Thus, said rays are not reflected off the other faces of the guide, which makes it possible to prevent the loss of some of these rays and therefore to have most of these rays reach the exit face.

By way of example, the cross section has a width, considered in the transverse direction, substantially equal to the thickness, considered in a direction perpendicular to the transverse direction and to the main direction. What is meant here by "substantially equal" is equality to within +/−10%.

By way of example, the cross section is generally circular or oval, with a closed and rounded contour.

According to one advantageous embodiment of the invention, the entrance face is formed from a general profile comprising the two-dimensional planar profile. Said two-dimensional planar profile has a height that corresponds to at least 50% of the maximum height of said general profile, said heights being considered in a direction perpendicular to said transverse direction.

According to one advantageous embodiment of the invention, the entrance face is formed from a general profile comprising the two-dimensional planar profile. Said two-dimensional planar profile has a height that corresponds to 100% of the maximum height of said general profile, said heights being considered in a direction perpendicular to said transverse direction.

According to one advantageous embodiment of the invention, the entire entrance face is constant along a transverse direction. In other words, the generator profile constitutes the general profile forming the entrance face.

According to one advantageous embodiment of the invention, the portion of constant profile of the entrance face comprises a convex central portion that is configured to refract the light from the light source incident on said central portion.

According to one advantageous embodiment of the invention, the portion of constant profile of the entrance face comprises two lateral portions each forming a kink with a proximal region configured to refract the light from the light source incident on said proximal portion and a distal region configured to reflect, by total internal reflection, the light refracted by said proximal region.

According to one advantageous embodiment of the invention, the portion of constant profile has said constancy over only part of the total extent of the entrance face, considered in said transverse direction.

According to one advantageous embodiment of the invention, the portion of constant profile has said constancy over the whole of the total extent of the entrance face, considered in said transverse direction.

According to one advantageous embodiment of the invention, the portion of constant profile corresponds to 50% or more of the entrance face.

According to one advantageous embodiment of the invention, the exit face extends along the main direction and has a height shorter than or equal to 30% of an average diameter of the light guide. What is meant by average diameter is an arithmetic mean, over one revolution, of the diameter of the cross section of the optical guide.

According to one advantageous embodiment of the invention, the decoupling face is opposite the exit face with respect to the main direction.

The measures of the invention are advantageous in that they make it possible to optimize the optical yield by reducing the distance traveled by the collimated light portion and thereby reduce losses by absorption in the transparent or translucent material of the optical guide. This portion of the light is then useful for illuminating a distal portion of the exit face. The measures of the invention are thus particularly advantageous for particularly long light guides, such as, for example, for a vehicle third brake light function extending across the entire width of said vehicle.

DETAILED DESCRIPTION

In the present disclosure and in particular in the following description, the concept of main direction of the light guide is to be understood at the location of the light guide to which reference is made. This nuance is important for non-rectilinear light guides, because this direction changes along the light guide. Thus, the concept of light guide refers to an optical part capable of guiding light by total internal reflection of this light, for example from an entrance region to an exit region.

Figure 1:
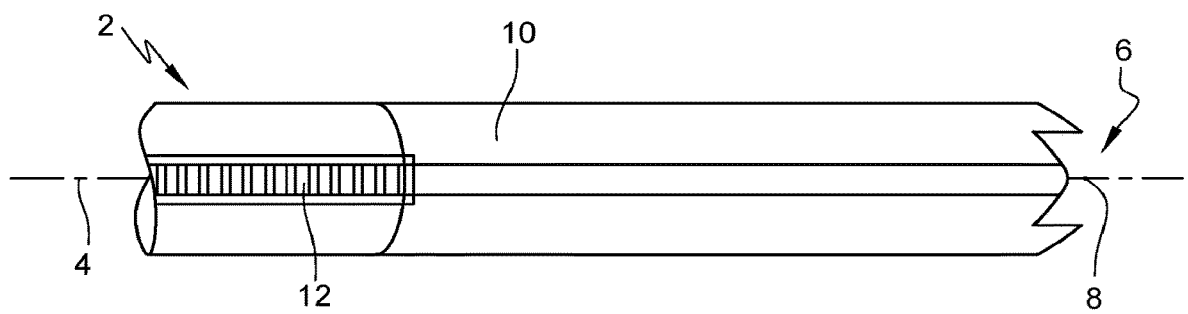
FIG. 1 is a rear view of a light guide according to the invention.

FIG. 1 illustrates a light guide according to the invention.

The light guide 2 is an optical element made of transparent or translucent material extending along a main direction 4, it being understood that this main direction 4 is not necessarily rectilinear. The light guide 2 has a generally circular or oval cross section, forming a closed and rounded contour. The light guide 2 comprises, at a front end, an entrance face 6 for the light produced by a light source 8, represented schematically by a point, arranged facing said entrance face 6. The latter has a profile that is specially designed to collimate a portion of the light incident on said face. This profile will be described in detail with reference to FIG. 2. The light guide 2 comprises a lateral guide face 10 for guiding by reflection the light propagating through the transparent or translucent material of the guide in question. This guide face 10 extends over essentially the entire length of the light guide 2, in the main direction 4 of said guide. The guide face 10 corresponds to the diopter formed by the longitudinal outer lateral surface of the light guide 2, between the material of said guide and the ambient air. The light guide 2 comprises a lateral decoupling face 12 that has a series of facets which are dimensioned and oriented so as to decouple the light propagating along the light guide 2 by deflecting it toward a lateral exit face (not visible in FIG. 1). The decoupling 12 and exit faces are adjacent to the guide face 10. These various features, with the exception of the profile of the entrance face, are in themselves conventional and well known to those skilled in the art, the general principle of light propagation and light output in a light guide being well known per se.

Figure 2:
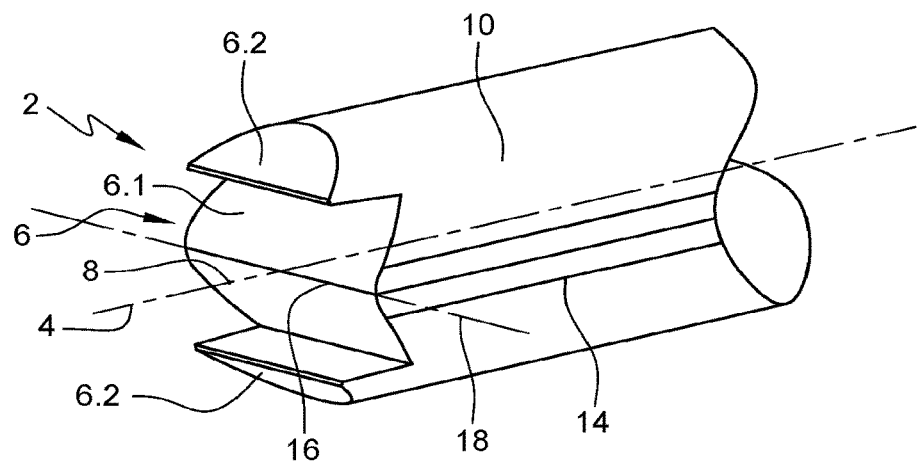
FIG. 2 is a front view of the front end of the light guide of FIG. 2.

FIG. 2 is a front perspective view of the front end of the light guide of FIG. 1. It is possible to see the exit face 14 directly adjacent to the guide face 10 and opposite the decoupling face (not visible in FIG. 2) along the direction of opposition 16. The exit face 14 is represented by two parallel lines for reasons of clarity of presentation; however, it is understood that this face does not necessarily have a physical boundary or limit with the guide face 10. The entrance face 6 has a collimation profile that is constant along a transverse direction 18 oriented along the direction of opposition 16 between the decoupling and exit faces 14. In other words, the surface of the entrance face 6 is formed or generated by a constant profile moving along the direction of opposition 16. Such surface generation is commonly referred to in vector graphics by the term "extrusion", by analogy with the industrial process of extruding material. However, the light guide is advantageously produced by injecting plastic material into a mold, and not by extrusion. The entrance face 6 is a three-dimensional surface formed by translation, along the transverse direction 18, of the two-dimensional planar profile. The profile in question, also called the generator profile, corresponds to a section of the entrance face 6 along a longitudinal plane perpendicular to the transverse direction 18 (which in this case is coincident with the direction of opposition 16). It comprises a central portion 6.1 of convex shape (seen from the outside, for example from the light source 8) and two lateral portions 6.2 each forming a kink. The central portion 6.1 is configured to refract the incident light along directions parallel to the main direction 4. The lateral portions 6.2 are configured to reflect, by total reflection, the light along directions parallel to the main direction 4. Such a profile corresponds to a Fresnel lens profile.

The entrance face 6, just described, has the particular feature of the shape of its profile being the same along a transverse direction 18, in this case the direction of opposition 16 between the decoupling 12 (FIG. 1) and exit 14 faces. This particular feature has the effect that the profile in question, initially designed as a collimating profile, will in fact collimate the light only in a plane perpendicular to the transverse direction 18 along which the profile is constant. This means that in a longitudinal plane comprising the transverse direction 18, the light will not be collimated at all. In other words, a portion of the light emitted by the light source will then be collimated, in this case the light emitted in the longitudinal plane perpendicular to the transverse direction 18. The advantage of this measure is that the light rays corresponding to this portion of the light will propagate parallel to the main direction of the guide, at least over a certain distance, and therefore undergo little or less reflection than the rest of the light. This reduction in the number of reflections, via a rectilinear path parallel to the main direction of the guide, has the effect of reducing the total path through the transparent or translucent material and, consequently, losses by absorption inherent to the material in question.

If the entrance face formed a complete or perfect collimator, that is to say a collimator such that all or almost all of the light entering the optical guide propagates parallel to the main direction of the optical guide, there would be no reflection and the decoupling face could not reflect a portion of the light toward the exit face. For these reasons, only a portion of the light is collimated, thereby making it possible to reduce the losses by absorption precisely of this portion of the light intended to supply a distal portion of the light guide. It should be noted in the case of a perfectly rectilinear light guide, this collimated portion of the light will, from a certain distance of propagation and because of imperfect collimation and the light guide, be incident on the guide face and/or the decoupling face and undergo reflections there. In other words, the partial collimation of the light entering the optical guide will delay the successive reflections off the guide face and off the decoupling face for a portion of the light.

Figure 3:
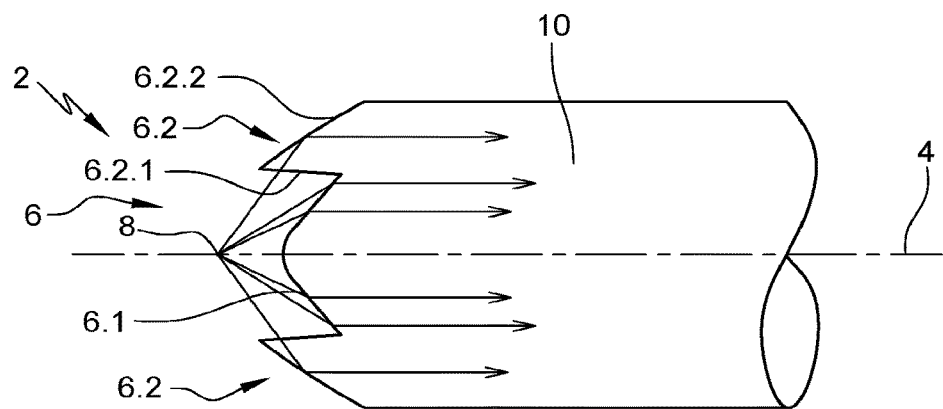
FIG. 3 schematically shows the path of the light in a longitudinal plane perpendicular to the transverse direction along which the profile of the entrance face is generated.

FIG. 3 illustrates the partial collimation of the light. FIG. 3 schematically shows the path of the light in a longitudinal plane perpendicular to the transverse direction 18 along which the profile of the entrance face is constant. With reference to FIG. 2, the plane in question passes through the light source 8 and the main direction 4 and is perpendicular to the transverse direction 18.

It can be seen that the light emitted by the light source 8, incident on the central portion 6.1 of the convex profile of the entrance face, is refracted so as to be parallel to the main direction 4. The rays in question form a cone centered on the light source 8, oriented along the main direction 4 and with an opening angle larger than 70° and/or smaller than 90°.

It can also be seen that the light emitted by the light source 8, incident on the lateral portions 6.2 of the profile of the entrance face 6, are refracted and then reflected along directions parallel to the main direction 4. Each of the lateral portions 6.2 forms a kink with a proximal region 6.2.1 configured to refract the light from the light source incident on said proximal portion and a distal region 6.2.2 configured to reflect, by total reflection, the light refracted by said proximal region.

Figure 4:
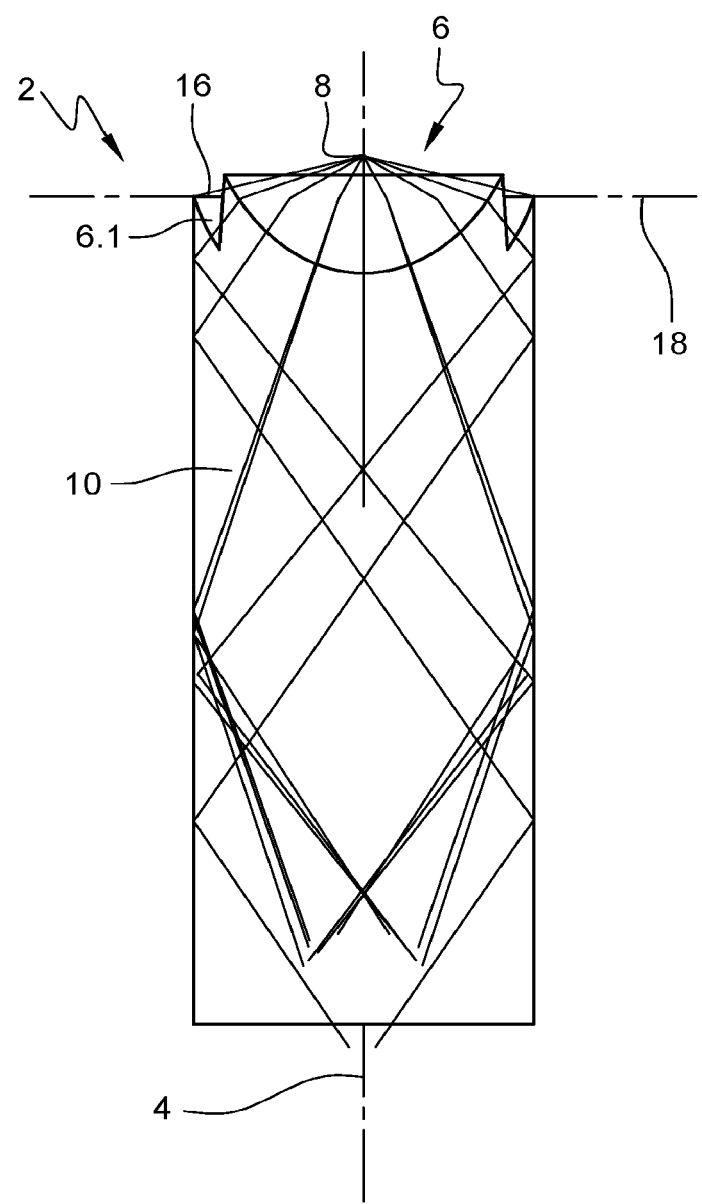
FIG. 4 schematically shows the path of the light in a longitudinal plane comprising the transverse direction along which the profile of the entrance face is generated.

FIG. 4 illustrates the absence of collimation of the light in a plane comprising the transverse direction 18 along which the profile of the entrance face is constant. FIG. 4 schematically shows the path of the light in a longitudinal plane comprising the transverse direction 18 along which the profile of the entrance face has the same shape.

It can be seen that all of the rays incident on the central portion 6.1 of the entrance face 6, and more precisely on the line of said central portion 6.1 corresponding to the transverse direction 18 along which the profile of the entrance face is constant, are refracted and then reflected by the guide face 10. These rays are not collimated and may participate in the illumination of a proximal portion of the exit region. Here, the term "constant" refers to the shape of the profile of the entrance face being constant along the transverse direction.

FIGS. 3 and 4, described above, illustrate the deflection of light rays by the entrance face in two perpendicular planes where the effects are maximum, namely that in the longitudinal plane perpendicular to the transverse direction along which the profile of the entrance face is constant, collimation is effective, and in the longitudinal plane comprising said transverse direction, there is no collimation. Between these two planes, in particular close to the longitudinal plane perpendicular to the transverse direction along which the profile of the entrance face is constant, there is approximate collimation in that the rays are close to being parallel to the main direction and thus are incident with respect to the guide face only at a certain distance from the entrance face, and with a large angle, leading to reflections with the same large angle. This means that these rays will also see their paths, over a given distance from the light guide, shortened and therefore be less subject to losses through absorption by the transparent or translucent material of the light guide.

In the embodiment just described, the effective direction of collimation is angularly offset with respect to the direction of opposition of the decoupling and exit regions, in this case by 90° since the transverse direction in which the profile of the entrance face is constant is coincident with the direction of opposition of the decoupling and exit regions. Such a configuration is advantageous in that the rays close to the longitudinal plane perpendicular to the transverse direction in which the profile of the entrance face is constant, undergoing approximate collimation, will be able to propagate via successive reflections off the guide face without interference with the decoupling and exit faces, at least at the beginning of the optical guide. After a certain distance along the optical guide, the successive reflections produce shifts that have the effect of mixing the rays and allowing them to encounter the decoupling face and then the exit face. However, it is possible to shift the direction of collimation with respect to that of the embodiment described above.

In general, depending on the effective length of the light guide and the illumination needs of the exit face, the entrance face may be configured to collimate a greater or lesser portion of the light emitted and incident on the entrance face.

By way of example, it is possible to provide an entrance face of which a portion forms a collimator with a constant or near-constant profile around the main direction over a given sector (for example 180°) and, next to that, a constant profile along a transverse direction. In other words, the entrance face may have one portion, for example a half, which corresponds to a conventional half-collimator and a remaining portion, in this case the other half, which corresponds to the half of the entrance face of the embodiment of FIGS. 1 to 4. Said remaining portion, or said other half, is the portion of the entrance face which is a three-dimensional surface formed by translation of the generator profile along the transverse direction. Said portion is also called the portion of constant profile.

Again by way of example, it is possible to provide an entrance face of which only a portion of the profile is constant along the transverse direction, called the portion of constant profile, the rest of the profile being able to remain constant by rotation about the main direction. With reference to FIG. 2, a horizontal central portion might have a constant under-profile along the transverse direction 18, that is to say with a height, in a direction perpendicular to the transverse direction 18, that corresponds to a fraction of the total height of the entrance face, with the rest of the entrance face, i.e.

above and below such a horizontal central portion, forming a collimator surface which is rotationally symmetrical about the main axis 4.

The invention claimed is:

1. A cylindrical light guide made of transparent or translucent material, extending in a main direction and comprising:
   an entrance face for the light emitted by a light source, said entrance face being profiled to form a collimator;
   a guide face for guiding the light through the transparent or translucent material by total internal reflection;
   a light exit face; and
   a decoupling face for decoupling the light toward the exit face by means of reflection facets, said decoupling face being transversely opposite to the exit face;
   wherein at least one portion of the entrance face is a three-dimensional surface formed by translating a two-dimensional planar profile in a transverse direction, referred to as a portion of constant profile, so as not to collimate the light in a longitudinal plane comprising the transverse direction and to collimate in a longitudinal plane perpendicular to said transverse direction, the portion of constant profile extending from the decoupling face to the light exit face; and
   the cylindrical light guide has a generally cylindrical profile along the main direction.

2. The cylindrical light guide as claimed in claim 1, wherein the transverse direction is perpendicular to the main direction.

3. The cylindrical light guide as claimed in claim 2, wherein the entrance face is formed from a general profile comprising the two-dimensional planar profile and in that said two-dimensional planar profile has a height that corresponds to at least 50% of the maximum height of said general profile, said heights being considered in a direction perpendicular to said transverse direction.

4. The cylindrical light guide as claimed in claim 2, wherein the entrance face is formed from a general profile comprising the two-dimensional planar profile and in that said two-dimensional planar profile has a height that corresponds to 100% of the maximum height of said general profile, said heights being considered in a direction perpendicular to said transverse direction.

5. The cylindrical light guide as claimed in claim 2, wherein the portion of constant profile of the entrance face comprises a convex central portion that is configured to refract the light from the light source incident on said central portion.

6. The cylindrical light guide as claimed in claim 2, wherein the portion of constant profile has said constancy over only part of the total extent of the entrance face, considered in said transverse direction.

7. The cylindrical light guide as claimed in claim 2, wherein the portion of constant profile has said constancy over the whole of the total extent of the entrance face, considered in said transverse direction.

8. The cylindrical light guide as claimed in claim 2, wherein the exit face extends along the main direction and has a height shorter than or equal to 30% of an average diameter of the cylindrical light guide.

9. The cylindrical light guide as claimed in claim 1, wherein the transverse direction corresponds to a direction of opposition between the decoupling face and the exit face.

10. The cylindrical light guide as claimed in claim 1, wherein the entrance face is formed from a general profile comprising the two-dimensional planar profile and in that said two-dimensional planar profile has a height that corresponds to at least 50% of the maximum height of said general profile, said heights being considered in a direction perpendicular to said transverse direction.

11. The cylindrical light guide as claimed in claim 1, wherein the entrance face is formed from a general profile comprising the two-dimensional planar profile and in that said two-dimensional planar profile has a height that corresponds to 100% of the maximum height of said general profile, said heights being considered in a direction perpendicular to said transverse direction.

12. The cylindrical light guide as claimed in claim 1, wherein the portion of constant profile of the entrance face comprises a convex central portion that is configured to refract the light from the light source incident on said central portion.

13. The cylindrical light guide as claimed in claim 1, wherein the portion of constant profile of the entrance face comprises two lateral portions each forming a kink with a proximal region configured to refract the light from the light source incident on said proximal portion and a distal region configured to reflect, by total internal reflection, the light refracted by said proximal region, wherein the kinks of the lateral portions form right angles with respect to the entrance face along the main direction of the cylindrical light guide.

14. The cylindrical light guide as claimed in claim 1, wherein the portion of constant profile has said constancy over only part of the total extent of the entrance face, considered in said transverse direction.

15. The cylindrical light guide as claimed in claim 1, wherein the portion of constant profile has said constancy over the whole of the total extent of the entrance face, considered in said transverse direction.

16. The cylindrical light guide as claimed in claim 1, wherein the exit face extends along the main direction and has a height shorter than or equal to 30% of an average diameter of the cylindrical light guide.

17. A light guide made of transparent or translucent material, extending in a main direction and comprising:
   an entrance face for the light emitted by a light source, said entrance face being profiled to form a collimator;
   a guide face for guiding the light through the transparent or translucent material by total internal reflection;
   a light exit face; and
   a decoupling face for decoupling the light toward the exit face by means of reflection facets, said decoupling face being transversely opposite to the exit face;
   wherein at least one portion of the entrance face is a three-dimensional surface formed by translating a two-dimensional planar profile in a transverse direction, referred to as a portion of constant profile, so as not to collimate the light in a longitudinal plane comprising the transverse direction and to collimate in a longitudinal plane perpendicular to said transverse direction, the portion of constant profile extending from the decoupling face to the light exit face.

18. The light guide as claimed in claim 17, wherein the transverse direction is perpendicular to the main direction.

19. A cylindrical light guide made of transparent or translucent material, extending in a main direction and comprising:
   an entrance face for the light emitted by a light source, said entrance face being profiled to form a collimator;
   a guide face for guiding the light through the transparent or translucent material by total internal reflection;
   a light exit face; and a decoupling face for decoupling the light toward the exit face by means of reflection facets, said decoupling face being transversely opposite to the exit face;

wherein at least one portion of the entrance face is a three-dimensional surface formed by translating a two-dimensional planar profile in a transverse direction, referred to as a portion of constant profile, so as not to collimate the light in a longitudinal plane comprising the transverse direction and to collimate in a longitudinal plane perpendicular to said transverse direction; and the cylindrical light guide has a generally cylindrical profile along the main direction.

20. The cylindrical light guide as claimed in claim 19, wherein the portion of constant profile of the entrance face comprises two lateral portions each forming a kink with a proximal region configured to refract the light from the light source incident on said proximal portion and a distal region configured to reflect, by total internal reflection, the light refracted by said proximal region, wherein the kinks of the lateral portions form right angles with respect to the entrance face along the main direction of the cylindrical light guide.

* * * * *